Oct. 1, 1957 J. C. KOONZ 2,808,518

ADJUSTING D. C. RESISTANCE OF LIGHT-SENSITIVE CELLS

Filed Jan. 6, 1956

JOHN C. KOONZ
INVENTOR.

BY Daniel I. Mayne,
Lloyd F. Seebach
ATTORNEY & AGENT

United States Patent Office 2,808,518

Patented Oct. 1, 1957

2,808,518

ADJUSTING D. C. RESISTANCE OF LIGHT-SENSITIVE CELLS

John C. Koonz, Fort Wayne, Ind., assignor, by mesne assignments, to Eastman Kodak Company, Rochester, N. Y., a corporation of Delaware Application January 6, 1956, Serial No. 557,672

8 Claims. (Cl. 250—233)

The present invention relates to apparatus for deriving electrical signals from light directed through a medium having opaque and transparent areas and onto a light-sensitive device and more particularly to an arrangement whereby the resistance of the light-sensitive device is adjusted to substantially halfway between the resistance of an opaque area and of a transparent area.

When a light-sensitive device is used to obtain electrical signals from light transmitted through a medium containing information in the form of opaque and transparent areas representative of code, the device is exposed to a light condition which establishes a reference condition in the device. This reference condition may be total darkness or a light intensity greater than that to which it is exposed when the medium is interposed between the light source and the device. The introduction of the medium causes a change from the normal condition and the magnitude of the change is dependent on the density of the medium and becomes important if a signal of proper magnitude is to be derived from the device. In addition the device may be in error due to variations in the cell itself and/or to other extraneous causes. With electrical circuits arranged to detect the information in such a medium, changes in the characteristics of the device can occur which result in ambiguous and incorrect readings.

The arrangement disclosed herein eliminates the possibilities of differences in magnitude due to the medium by providing a reference condition which produces a different polarity signal for the two states; namely, a positive signal for an opaque spot or area and a negative signal for a transparent or clear area. With this arrangement, there is no longer any need for relying on the difference in magnitude of a signal to determine whether the code spot is opaque or clear.

The primary object of the invention is, therefore, to provide a background illumination of a light-sensitive device to adjust the D. C. resistance of said device substantially halfway between the resistance of an opaque area and a transparent area.

Another object of the invention is to provide an arrangement in which a light-sensitive device is illuminated on one side with light substantially halfway between an opaque area and a transparent area and blocked on the other side from the light transmitted through the medium and in which the light conditions imposed on the device are reversed for a predetermined interval to obtain a positive signal from an opaque spot and a negative signal from a transparent spot.

Still another object of the invention is to provide an arrangement in which a light-sensitive device, or a plurality of such devices, is subjected to a reversal of the light conditions normally imposed thereon for a predetermined interval and only during the interval a positive D. C. potential is applied to said device or devices.

And still another object of the invention is to provide a shutter arrangement by which the light conditions imposed on opposite sides of a plurality of light-sensitive devices can be reversed during a predetermined interval of the application of a positive D. C. potential to said devices and when the medium being read is stationary in the reading station, thereby deriving a positive signal from an opaque spot and a negative signal from a transparent area.

The derivation of a positive or a negative signal from a light-sensitive device is obtained by illuminating two sides of the device by either the same or two separate light sources. The light directed to one side of the device is adjusted to a density such that the D. C. resistance of the device is substantially halfway between the resistance of a clear or transparent area and an opaque area. The light directed to the other side of the device first passes through the medium to be read and the clear and opaque areas are then imaged on the device or devices which are arranged in the same manner as the clear and opaque areas on the medium. A shutter means comprising a transparent element having an opaque portion and an opaque element having a transparent portion are arranged with respect to said devices so that the transparent element permits illumination of the one side of the devices and the opaque element prevents illumination of the other sides of said devices, the opaque and transparent portions of the elements being aligned. The shutter means is moved in synchronism with the means for intermittently moving the medium into and out of the reading station. Since the opaque and clear or transparent portions are aligned, they are moved in unison and are arranged so that they reverse the light conditions imposed on the devices during a predetermined interval of the application of the positive D. C. potential to the devices and when the medium is stationary in the reading station. During this predetermined interval the opaque portion of the transparent shutter element prevents illumination of the one side of the devices and the clear or transparent portion of the opaque shutter element permits illumination of the other side of the devices. In other words, the light conditions are reversed. An opaque area projected on its respective device during this interval will, therefore, cause an increase in resistance of the device and an increased or more positive output from the device. On the other hand, a transparent area will cause a decrease in resistance of the device and a decreased or less positive (negative) output. The description which follows in conjunction with the drawings will more clearly set forth the manner in which this result is accomplished.

Other objects and advantages will be readily apparent to those skilled in the art by the description which follows.

Reference is now made to the accompanying drawing in which like reference numerals designate like parts and wherein.

Figures 1, 2, 3, 4, 5:
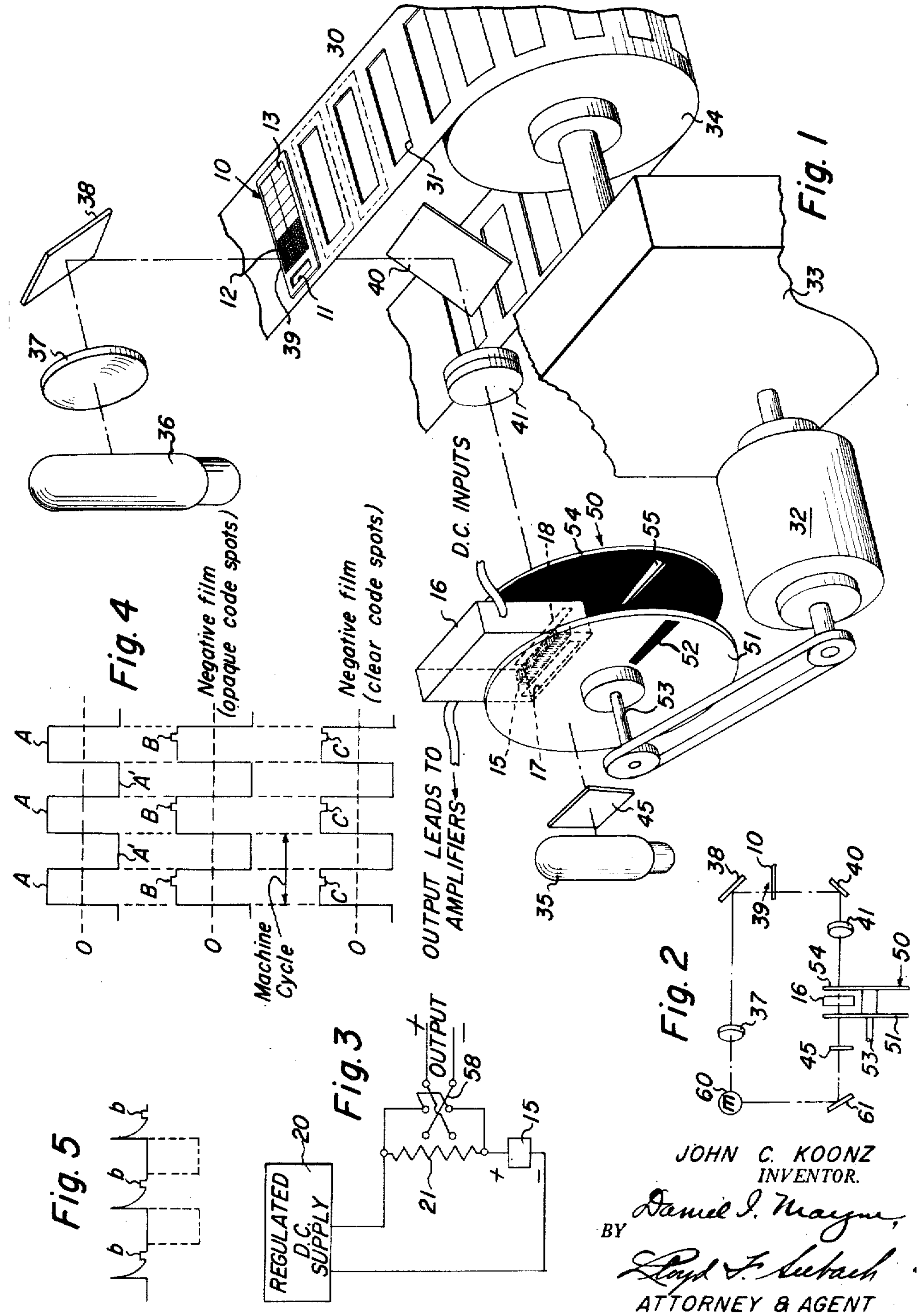
Fig. 1 is a diagrammatic perspective view of one embodiment of the invention in which separate sources of illumination are utilized for each side of the light-sensitive devices.
Fig. 2 is a diagrammatic view of another embodiment of the invention in which a single source of illumination is utilized for both sides of the light-sensitive devices.
Fig. 3 is a schematic arrangement showing a single light-sensitive device in relation to the applied potential and the output derived therefrom.
Fig. 4 is a group of voltage patterns showing the output derived from said device with respect to the resistance thereof.
Fig. 5 is a voltage pattern showing the appearance of one of the patterns in Fig. 4 which has been differentiated and clipped to remove the negative portion of the D. C. potential.

In the arrangement disclosed in the accompanying drawing the light is transmitted through the medium to the light-sensitive device or devices; however, it is to be understood that light reflected from the clear and opaque areas can be equally well adapted to obtain the same result. By light-sensitive device is meant a phototube, photocell, or any photoconductive device, such as a lead sulfide cell. In the arrangement disclosed, lead sulfide photoconductive cells are utilized, although other types can also be used.

The medium 10, as shown in Fig. 1, comprises a piece of photographic film having an elongated aperture 11 at one end thereof, an area 12 in which lines of code in the form of clear and opaque spots have been exposed and a document image area 13 in which a plurality of documents have been photographed. Each line of code comprises a plurality of code bits, i. e., transversely of the film, and a light-sensitive device 15 is associated with each bit and arranged linearly in the same manner in receptacle 16 which is provided with apertures 17 and 18 for permitting light to fall on two sides of each of said devices.

With respect to Figs. 3 and 4, each of devices 15 is connected to a regulated D. C. potential supply 20 with a resistance 21 in series with said device and said supply. Supply 20 is capable of delivering a voltage pattern of changing polarity to device 15, a positive and a negative signal for each machine cycle, as indicated at A and A′ in Fig. 4. If the output is taken off across resistance 21, then a clear spot in the line of code will produce a voltage pattern of a magnitude different from that produced by an opaque spot. However, if the resistance of each device 15 can be adjusted substantially midway between that of a clear spot and an opaque spot, then for the interval the device is exposed to an opaque spot an increased positive signal B is obtained, as shown in Fig. 4 and by differentiating and clipping this voltage pattern, a positive signal as shown at *b* in Fig. 5 can be obtained. Likewise, a clear code area provides a decrease in positive potential, or negative signal when differentiated, as shown at C in Fig. 4. These conditions assume, of course, that medium 10 is a negative film and the code is represented by the opaque spots.

Mediums 10 are fed or placed on the conveyor belt 30 with respect to apertures 31 therein. Motor 32 drives one of the elements of a Geneva movement which is enclosed in the receptacle 33 and which, in turn, drives one of the rollers or sprockets 34 for imparting an intermittent movement to belt 30. The light emitted from lamp 35 and passing through aperture 17 serves to illuminate the one side of cells 15. Lamp 36 by means of condenser lens 37 and mirror 38 directs the light from lamp 36 through medium 10, medium 10 being positioned by belt 30 in a reading position under mirror 38 and aligned with the optical axis thereof. Belt 30, therefore, provides a means for moving successive elements into and out of the reading position or station 39, and a mask, not shown, is positioned in said station for determining the line of code that is to be read. The light directed through medium 10 is reflected by mirror 40 into projection lens 41 which images the array of clear or transparent code bits on the respective cells 15 through aperture 18.

By placing a filter or a piece of film 45 between lamp 35 and aperture 17, the resistance of devices 15 is varied in accordance with the density of such filter or film. It has been found, however, that best results are attained if the density of filter 45 is substantially halfway between that of a clear spot and an opaque spot in medium 10. The density of such clear and opaque spots will vary depending on the medium. For example, if punched cards were being read, the code areas would be clear and opaque because a punched hole permits the full amount of light to pass through whereas an unpunched hole will permit no light to pass through. In the disclosure described, however, a clear area will not permit as much light to pass through as a punched hole and an oqaque area will not prevent all light from passing through as is possible in an unpunched hole. The designation clear or transparent and opaque will, therefore, vary somewhat with the medium; however, this difference is not of sufficient importance to alter the results obtained.

The medium 10 can be read when stationary or during movement through station 39. Shutter means 50 is provided so that the reading is obtained during this interval in the machine cycle and also during a predetermined interval of each machine cycle when the positive D. C. potential is applied to said devices or only during the latter predetermined interval. Such shutter means 50 comprises a transparent disc 51 having an opaque sector or portion 52 of a size to prevent transmission of the light from lamp 35 to the one side of devices 15 when said portion is aligned with aperture 17, disc 51 being arranged between filter 45 and aperture 17. Disc 51 is mounted on shaft 53 to which an opaque disc 54 is also mounted. Disc 54 is arranged between receptacle 16 and lens 41 and is provided with a transparent portion or sector 55 which permits the array of code areas to be imaged on their respective devices when said sector is aligned with aperture 18. Discs 51 and 54 can be of glass with sectors 52 and 55 suitably made opaque or clear, or sector 52 can be of metal extending from a flange or carrier mounted on shaft 53 and disc 54 can be of metal provided with a suitable aperture. Sectors 52 and 55 are, however, aligned so that shaft 53 which is driven by belt 56 from motor 32 is rotated in synchronism with the movement of belt 30 carrying mediums 10.

Sectors 52 and 55 are arranged to reverse the light conditions imposed on devices 15 so that signals B and C, shown in Fig. 4, are obtained during a predetermined interval of the application of the positive D. C. potential to said devices 15 when medium 10 is stationary in reading station 39 or moving therethrough and only once for each machine cycle. As is evident from the description thus far and from the drawing, disc 51 permits the light emitted from lamp 35 and which passes through filter 45 to fall upon the one side of devices 15 except for the interval sector 52 is moved past aperture 17. Likewise, the opaque disc 54 permits light to fall on devices 15 only when aperture or sector 55 is moved past aperture 18. Consequently, since the resistance of devices 15 has been established by filter 45 at a point midway between a clear and an opaque spot, the clear or opaque spot imaged on its respective device by lens 41 causes a decrease or increase, respectively, in the resistance and in the output voltage. The rotation of discs 51 and 54, as a unit by the drive connecting said discs to motor 32, is such that a complete revolution of said discs is made during each machine cycle which also includes the movement of medium 10 into and out of the reading station 39. While shutter means 50 is disclosed as comprising two rotating discs, such shutter means can be of a reciprocating type as well.

If medium 10 is a negative film, the code bits in the line to be read are the opaque areas. As a result, only the positive signals are required to be amplified and the negative signals, which are obtained from the clear areas together with the positive signals, can be discarded. If medium 10 is a positive film, the code bits in the line to be read will then be the clear or transparent areas which will produce a negative signal. However, by reversing the polarity of the potential applied to devices 15, or by providing a reversing switch 58 across the output of said devices, a positive signal is also obtained for the transparent areas. In this manner, an output signal of the same polarity can be derived from either a negative or a positive film. While the negative signal C can normally be discarded since both positive and negative signals will be derived from each line of code, the two signals can be utilized for check purposes, if desired.

In Fig. 2 of the drawing an arrangement is disclosed in which a single lamp 60 is utilized for illuminating both sides of the light-sensitive devices in receptacle 16. The arrangement of the elements is substantially the same as that disclosed in Fig. 1 with the exception that mirror 61 is required to direct the light through filter 45, aperture 17, and to the one side of device 15. Lenses 37 and 41 and mirrors 40 and 41 are utilized as described hereinbefore together with shutter means 50 comprising transparent disc 51 and opaque disc 54.

Since other modifications of the invention will be apparent to those skilled in the art, the invention is not to be limited to the disclosure described but is defined by the appended claims.

Having now particularly described my invention, what I desire to secure by Letters Patent of the United States and what I claim is:

1. In an apparatus of the character described for deriving electrical signals from light transmitted through a medium having opaque and transparent areas, the combination comprising a light-sensitive device, means for applying a D. C. potential of periodic positive polarity to said device, means for illuminating one side of said device to establish the resistance thereof substantially half-way between an opaque area resistance and a transparent area resistance and for illuminating said medium and the other side of said device, shutter means arranged adjacent each side of said device for permitting transmission of light to the one side of said device and for preventing transmission of light to the other side of said device and having portions thereof for reversing the light conditions imposed on said device by said shutter means during a predetermined interval of the application of the positive potential to said device, and means for moving said shutter means whereby during said predetermined interval an output signal of increased positive potential is derived from an opaque area and of decreased positive potential is derived from a transparent area.

2. In an apparatus of the character described for deriving electrical signals from light transmitted through a medium having opaque and transparent means, the combination comprising a light-sensitive device, means for applying a D. C. potential of periodic positive polarity to said device, means for illuminating one side of said device to establish the resistance thereof substantially half-way between an opaque area resistance and a transparent area resistance and for illuminating said medium and the other side of said device, a transparent member arranged with respect to the one side of said device and having an opaque portion for preventing transmission of light to said device, an opaque member arranged with respect to the other side of said device and between said device and said medium and having a transparent portion for permitting transmission of the light from said medium to the other side of said device, said transparent and opaque members being interconnected and said portions thereof being aligned, and means for moving said transparent and opaque members with respect to said device whereby said portions thereof reverse the light conditions normally imposed on said device only during the application of the positive potential thereto and for a predetermined interval thereof to derive an output signal from said device of an increased positive potential from an opaque area and of a decreased positive potential from a transparent area.

3. In an apparatus of the character described for deriving electrical signals from light transmitted through a medium having opaque and transparent areas, the combination comprising a light-sensitive device, means for applying a D. C. potential of periodic positive polarity to said device, a light source, means for directing light from said source to one side of said device and through said medium to the other side of said device, means arranged between said light source and the one side of said device for establishing the resistance of said device substantially half-way between an opaque area resistance and a transparent area resistance, a transparent member arranged with respect to the one side of said device and having an opaque portion for preventing transmission of light to said device, an opaque member arranged with respect to the other side of said device and between said device and said medium and having a transparent portion for permitting transmission of the light directed through said medium to the other side of said device, said transparent and opaque members being interconnected and said portions thereof being aligned, and means for moving said transparent and opaque members with respect to said device whereby said portions thereof reverse the light conditions normally imposed on said device only during the application of the positive potential thereto and for a predetermined interval thereof to derive an output signal from said device of an increased positive potential from an opaque area and of a decreased positive potential from a transparent area.

4. In an apparatus of the character described for deriving electrical signals from light transmitted through a medium having opaque and transparent areas, the combination comprising a light-sensitive device, means for applying a D. C. potential of periodic positive polarity to said device, a light source, optical means for directing light from said source to one side of said device and through said medium to the other side of said device, means arranged between said light source and the one side of said device and of a light transmitting density for establishing a normal resistance in said device substantially half-way between an opaque area resistance and a transparent area resistance, a transparent member arranged with respect to the one side of said device and having an opaque portion for preventing transmission of light to said device, an opaque member arranged with respect to the other side of said device and between said device and said medium and having a transparent portion for permitting transmission of the light directed through said medium to the other side of said device, said transparent and opaque members being rotatably mounted with respect to the same axis and for rotation as a unit and said portions thereof being aligned, and means for rotating said transparent and opaque members whereby said portions thereof reverse the light conditions normally imposed on said device only during the application of the positive potential thereto and for a predetermined interval thereof to derive an output signal from said device of an increased positive potential from an opaque area and of a decreased positive potential from a transparent area.

5. In an apparatus of the character described for deriving electrical signals from light transmitted through a medium having opaque and transparent areas, the combination comprising a light-sensitive device, means for applying D. C. potential of periodic positive polarity to said device, a light source for illuminating one side of said device, means arranged between said light source and the one side of said device and of a light transmitting density for establishing a normal resistance in said device substantially half-way between an opaque area resistance and a transparent resistance, a second light source, optical means for directing the light from said second light source through said medium and to the other side of said device, shutter means including a transparent member arranged between said density means and the one side of said device and having an opaque sector for preventing transmission of light to said device and an opaque member arranged adjacent the other side of said device and having a transparent sector in alignment with said opaque sector for permitting transmission of the light directed through said medium to the other side of said medium, said sectors reversing the light conditions imposed on said device by said members only during a predetermined interval of the application of the positive potential to said device, and means operatively connected to said shutter means for imparting rotation thereto whereby during said predetermined interval an output signal is derived from said device of increased positive potential from an opaque area and of decreased positive potential from a transparent area.

6. In an apparatus of the character described for deriving electrical signals from light transmitted through a medium having opaque and transparent code areas arranged transversely thereof, the combination comprising a reading station, means for intermittently moving a medium into and out of said station, a plurality of light-sensitive devices arranged in accordance with the pattern of said opaque and transparent areas, means for applying a D. C. potential of periodic positive polarity to each of said devices, means for illuminating one side of said devices to establish a resistance in each device substantially half-way between an opaque area resistance and a transparent area resistance and including optical means for directing said illumination through said medium and imaging the array of opaque and transparent areas on the other side of the respective devices, shutter means arranged adjacent the one side and the other side of said device for permitting transmission of light to the one side of said devices and for preventing transmission of light to the other side of said devices and having portions thereof for reversing the light conditions imposed on said devices only during a predetermined interval of the application of the positive potential to said device and when said medium is stationary in said station, and means for moving said intermittent means and said shutter means in timed relation whereby during said predetermined interval an output signal of increased positive potential is derived from each device having an opaque area imaged thereon and an output signal of decreased positive potential is derived from each device having a transparent area imaged thereon.

7. In an apparatus of the character described for deriving electrical signals from light transmitted through a medium having opaque and transparent code areas arranged transversely thereof, the combination comprising a reading station, means for intermittently moving a medium into and out of said station, a plurality of light-sensitive devices arranged in accordance with the pattern of said opaque and transparent areas, means for applying a D. C. potential of periodic positive polarity to each of said devices, a light source, means for directing light from said source to one side of said devices and through said medium to the other side of said devices, means arranged between said light source and the one side of said devices for establishing the resistance of each of said devices substantially half-way between an opaque area resistance and a transparent area resistance, a transparent member arranged with respect to the one side of said devices and having an opaque portion for preventing transmission of light to said devices, an opaque member coupled to said transparent member for movement therewith and having a transparent portion aligned with said opaque portion for permitting transmission of the light directed through said medium to the other side of said devices, means operatively connected to said intermittent means and to said transparent member for moving said medium and said members in timed relation whereby said portions reverse the light conditions imposed on said devices by said members only during the application of the positive potential thereto and for a predetermined interval thereof and when said medium is stationary in said station to derive an output signal of increased positive potential from each device exposed to an opaque area and an output signal of a decreased positive potential from each device exposed to a transparent area.

8. In an apparatus of the character described for deriving electrical signals from light transmitted through a medium having opaque and transparent areas, the combination comprising a reading station, means for intermittently moving a medium into and out of said station, a plurality of light-sensitive devices arranged in accordance with the pattern of said opaque and transparent areas, means for applying a regulated D. C. potential of periodic positive polarity to each of said devices, means arranged between said light source and said devices and of a light transmitting density for establishing a normal resistance in said devices substantially halfway between an opaque area resistance and a transparent area resistance, a second light source, optical means for directing the light from the second source through the medium in said station and for imaging the array of opaque and transparent area on the other side of said respective devices corresponding to said areas, shutter means including a transparent member arranged between said density means and the one side of said devices and having an opaque sector for preventing transmission of light to said devices and an opaque member arranged adjacent the other side of said devices and having a transparent sector in alignment with said opaque sector for permitting transmission of the light directed through said medium to the other side of said devices, said sectors reversing the light conditions imposed on said device by said members only during a predetermined interval of the application of the positive potential to said device and when said medium is stationary and in said station, and means operatively connected to said intermittent means and to said shutter means for imparting movement thereto in timed relation whereby during said predetermined interval an output signal of increased positive potential is derived from each device having an opaque area imaged thereon and an output signal of decreased positive potential is derived from each device having a transparent area imaged thereon.

No references cited.

UNITED STATES PATENT OFFICE

CERTIFICATE OF CORRECTION

Patent No. 2,808,518 October 1, 1957

John C. Koonz

It is hereby certified that error appears in the above numbered patent requiring correction and that the said Letters Patent should read as corrected below.

In the grant, line 3, and in the heading to the printed specification, line 6, State of incorporation, for "a corporation of Delaware" read -- a corporation of New Jersey --.

Signed and sealed this 3rd day of December 1957.

(SEAL)

Attest:

KARL H. AXLINE
Attesting Officer

ROBERT C. WATSON
Commissioner of Patents